United States Patent Office 2,699,054
Patented Jan. 11, 1955

2,699,054

TETRACYCLINE

Lloyd H. Conover, Oakdale, Conn.

No Drawing. Application October 9, 1953,
Serial No. 385,041

18 Claims. (Cl. 260—559)

This invention is concerned with novel antimicrobial agents. In particular, it is concerned with the preparation of hitherto undescribed compounds derived from chlortetracycline (available as Aureomycin). The present application is a continuation-in-part of my copending application Serial No. 316,543, filed October 23, 1952 (now abandoned).

A variety of agents have been discovered which are therapeutically effective against various microorganisms. Some of these compounds have sufficiently low toxicity so that they may be administered to humans and to animals for the treatment of various diseases. These compounds are very valuable aids to the medical and bacteriological professions. However, they often possess deficiencies which tend to limit or detract from their value.

It is an object of this invention to prepare a new antimicrobial agent and its salts from chlortetracycline or from salts of chlortetracycline. It is a further object to prepare these new compounds in high yield. These compounds have certain definite advantages over currently available antibiotic compounds. Other objects will be apparent from the description below.

It has been found that under certain conditions chlortetracycline may be catalytically hydrogenated and reduced to a compound lacking in non-ionic chlorine (that is, chlorine attached to carbon). The new compound produced is microbiologically active and possesses certain advantages as an antimicrobial agent when compared to the parent chlortetracycline compound, e. g. it is more stable in aqueous preparations particularly at slightly basic pH's. It has been determined that this compound is the tetracycline postulated in the publication of myself and coworkers appearing on October 5, 1952, in the Journal of the American Chemical Society (vol. 74, pages 4976–4977). Since this is an amphoteric compound, it may be converted to a variety of salts not only with acids but also with bases.

The products of this invention are a new class of antibiotics never before described. During the preparation non-ionic chlorine is removed from the chlortetracycline molecule and the product may be isolated in purified form, free from non-ionic halogen. Tetracycline and its salts possess a high order of antimicrobial activity when evaluated by standard, accepted procedures.

It is preferred to use chlortetracycline itself as the reactant, that is the amphoteric compound, substantially free from metallic ion or acid. During the reduction a molecule of hydrogen chloride is formed. This combines with the basic function of the molecule to form the hydrochloride of the new antibiotic, tetracycline, unless some more basic material is present to react with the hydrogen chloride. If an acid salt such as chlortetracycline hydrochloride is used as starting material, it is preferred to add a slightly soluble mild base such as barium carbonate, calcium carbonate or strontium carbonate which will neutralize the hydrogen chloride formed during the reaction. When pure chlortetracycline is used as starting material, it is particularly easy to obtain crystalline tetracycline as the product. If no basic material is included in the reaction mixture tetracycline hydrochloride is formed as the product. By careful neutralization, this may be converted to tetracycline. The use of an alkali metal hydroxide is most convenient.

The process is carried out by contacting an organic solvent solution of chlortetracycline with hydrogen in the presence of palladium catalyst. Various solvents may be used for this purpose. A mixture of methanol and dioxane is particularly suitable, although methanol alone may be used, as well as other polar organic solvents, such as ethanol, isopropanol and so forth. Certain ethers, e. g. Cellosolve, tetrahydrofurane, dimethoxyethane are also useful. The solvent must be relatively inert to the reactant and to the product formed. In general, the solvent or mixture of solvents should be relatively dry. A small amount of moisture does not interfere seriously with the new reaction.

The reaction may be conducted under atmospheric pressure of hydrogen. However, a slightly elevated pressure assists in speeding the reaction. Pressures up to about 200 p. s. i. are quite suitable for this purpose, while a pressure of about 5 to 50 p. s. i. is generally suitable. The reaction may be conducted at room temperature, although somewhat elevated temperatures up to about 50° C. do not interfere seriously with the reaction. The catalyst used may be palladium in any one of various forms. It has been found that palladium of different types such as palladium-on-charcoal, the finely divided metal itself, etc. are very suitable. A concentration of catalyst of at least 5% by weight of the antibiotic used is necessary. In general, there is no reason to use more than an equal weight of catalyst. Other catalysts such as platinum or Raney nickel may be used in conducting the present process, however, care must be taken not to go beyond the desired product, and these materials are not as generally useful as palladium catalysts.

Although the reaction under most conditions usually takes from one to about twelve hours to produce an appreciable amount of product, it should be realized that this time and the various other operating conditions for the reaction are interdependent. That is, the time of the reaction, the temperature, pressure, concentration of antibiotic used, type of catalyst and so forth are all related.

In general, a solution having a concentration of from about 1% to about 10% by weight of the starting material is satisfactory for use in the present reaction. More dilute or more concentrated solutions may be used, but there is no particular advantage in such. In general, after approximately one molar quantity of hydrogen has been absorbed by the reaction mixture, the rate of adsorption tends to diminish or cease. The product may then be recovered by any desired means, most simply by removal of the catalyst and concentration of the solution. A solid may be recovered from concentrated solutions of the product by adding a non-solvent for the product, preferably an organic non-polar solvent. Non-solvents include diethyl ether, pentane, benzene, toluene and chloroform. It is advisable to avoid elevated temperatures during the recovery of the product, although temperatures slightly higher than room temperature are not deleterious. The product is obtained as a bright yellow material which is soluble in water. When amphoric chlortetracycline is used as starting material, the compound obtained initially is tetracycline hydrochloride. By adjusting the pH of an aqueous solution of this material until it is slightly acidic, there may be obtained the free base form of the new product, tetracycline itself. The free base also possesses appreciable solubility in water. However, by evaporation or other careful removal of the water, the product may be obtained as the solid material. The amphoteric tetracycline may be extracted at a suitable pH from aqueous solutions with certain water immiscible organic solvents. It is preferred to effect this extraction at a pH of approximately 4.0–5.0. Solvents such as butanol or ether are useful for this purpose. Upon concentrating the solvent, the crystalline base separates. It may be recrystallized from certain solvents such as toluene to obtain the anhydrous amphoteric tetracycline in highly purified form.

Tetracycline has been isolated in pure crystalline form. This material has been found to melt at 170–175° C. with decomposition. This product has an optical rotation of $[\alpha]_D^{25} = -239°$ when dissolved in methanol at a concentration of 1%. On titration in 50% aqueous dimethylformamide two acid constants were observed, $pk_a$ 8.3, 10.2. The crystalline product was analyzed and found to contain: C, 59.35%; H, 5.41%; N, 6.15%. The analyses calculated for $C_{22}H_{24}N_2O_8$: C, 59.45%; H, 5.44%; N, 6.31%. The equivalent weight by titration was found to be 227. The calculated molecular weight is 444. Ultraviolet absorption maxima occur at about 270 and 362 mμ when the material is dissolved in methanol 0.01 N in hydrogen chloride. In methanolic solution 0.01 N in sodium hydroxide absorption maxima occur at 245, 265 and 382 mμ.

Since tetracycline is an amphoteric compound just as are chlortetracycline and oxytetracycline (Terramycin), a variety of salts may be prepared from the antibiotic with various bases or acids. Since the basic and acidic groups of the antibiotic are not particularly strong, a strong acid or a strong base is preferably used in the formation of stable salts of the antibiotic. Salts of the same type as those previously prepared from chlortetracycline and oxytetracycline may also be prepared from tetracycline and by the same processes. In general, the acid or base should be chosen keeping in mind the use to which the salt is to be put. Thus, if the salt is to be administered to humans or animals internally, an acid or base is chosen which is relatively non-toxic. If, however, the antibiotic is to be used for treatment of, for instance, plant diseases, the toxicity of the acid or base used for forming the salt is not nearly as important. In general, the preferred acids are the mineral acids, which are sufficiently strong to form stable tetracycline salts. These acids include hydrochloric acid, sulfuric acid, nitric acid and phosphoric acid. In the preparation of a metal salt of tetracycline, it is also important that a strong base be used. In general, the alkali metal bases, that is sodium hydroxide, potassium hydroxide, lithium hydroxide, etc., and the alkaline earth metal bases (e. g. calcium hydroxide, barium hydroxide, etc.) are the most useful.

The acid and metal salts of tetracycline may be prepared by treating the amphoteric compound with approximately one equivalent of the chosen acid or base. This may be done in aqueous solution or in a suitable solvent. Upon careful evaporation of the solvent the solid salt may be obtained. When the product is prepared in aqueous solution, the solid may be produced by drying from the frozen state. Alternatively the salts may be separated by addition of a non-solvent for the product, for instance, the addition of ether to a methanol solution of the product will cause precipitation of the salt.

Tetracycline and tetracycline salts possess a high order of activity against a variety of microorganisms including both gram-positive and gram-negative species. This action has been measured quantitatively by means of a serial dilution procedure, widely employed in testing antibiotics. In the following table some of these values are given:

TABLE I

*Activity in vitro of tetracycline*

| Species | Minimum Inhibitory Concentration (mcg./ml.) |
| --- | --- |
| Aerobacter aerogenes | 50.0 |
| Klebsiella pneumoniae | 12.5 |
| Escherichia coli | 1.56 |
| Salmonella typhosa | 0.78 |
| S. paratyphi | 0.78 |
| Staphylococcus aureus | 0.19 |
| Proteus sp | 50.0 |
| Pseudomonas sp | 12.5 |
| Brucella bronchisepticae | 0.39 |
| Mycobacterium ranae | 0.19 |
| Streptococcus faecalis | 0.19 |

The new products prepared by the process of this invention have definite utility as antimicrobial agents. They may be used in sterilization to remove susceptible microorganisms from pharmaceutical equipment of various types or to separate certain species from solutions containing mixtures of various types of microorganisms. They also possess utility in the treatment of animals infected with certain organisms which are sensitive to the action of the material; in particular, those which belong to the gram-positive group of microorganisms.

The following example is given by way of illustration and is not to be considered as the only embodiment of this invention. It is to be understood that protection hereof is only to be limited by the specific wording of the appended claims.

EXAMPLE I

Pure chlortetracycline (4.8 grams) was suspended in 100 milliliters of methanol and sufficient anhydrous dioxane was added to completely dissolve the product. To the solution was added 0.5 gram of 5% palladium-on-charcoal catalyst. The mixture was placed in a conventional hydrogenation apparatus and subjected to a pressure of 50 p. s. i. of hydrogen while being agitated. After the initial drop in pressure due to the absorption of gas by the catalyst and the solvent, there was a steady drop in pressure due to the hydrogenation of the antibiotic. After approximately one mole of hydrogen had been absorbed, no further reaction was observed. This occurred after about two hours. The catalyst was filtered and washed with boiling methanol and boiling dioxane. The solution gave a positive test for chloride ion when treated with silver nitrate solution. It also possessed a strongly acidic reaction demonstrating the release of the non-ionic chlorine in the form of hydrogen chloride. A bioassay of the crude product in solution indicated a potency of approximately 580 mcg./mg. with oxytetracycline as the standard at a potency of 1,000 mcg./mg. The solution was concentrated under vacuum at room temperature and the residual liquid was dried from the frozen state under vacuum. 3.1 gm. of bright yellow amorphous tetracycline hydrochloride was obtained.

This product was converted to tetracycline per se by redissolving it in water, carefully neutralizing it to pH 4.5 with dilute sodium hydroxide, and recovering the product by drying the solution.

The crystalline amphoteric compound was prepared by extracting the aqueous solution of the base, prepared as above, with butanol (other solvents such as ether may also be used) and concentrating the solvent extracts to a small volume. The crystalline product was recrystallized from toluene to obtain material of analytical purity, the analyses and physical constants of which are given above.

What is claimed is:
1. A compound chosen from the group consisting of tetracycline, the mineral acid salts of tetracycline, the alkali metal salts of tetracycline and the alkaline earth metal salts of tetracycline.
2. Tetracycline.
3. Mineral acid salts of tetracycline.
4. Alkali metal salts of tetracycline.
5. Alkaline earth metal salts of tetracycline.
6. Tetracycline hydrochloride.
7. A process for the preparation of tetracycline hydrochloride which comprises contacting an organic solvent solution of chlortetracycline with hydrogen in the presence of a catalyst selected from the group consisting of palladium, platinum and Raney nickel until approximately one mole of hydrogen has reacted with each mole of chlortetracycline used.
8. A process for the preparation of tetracycline hydrochloride which comprises contacting a solution of chlortetracycline in an inert polar organic solvent with hydrogen in the presence of a palladium catalyst at about room temperature and under an elevated pressure up to about 200 p. s. i. until approximately one mole of hydrogen has reacted with each mole of chlortetracycline used.
9. A process for the preparation of tetracycline which comprises reacting one mole of chlortetracycline in an inert organic solvent with approximately one mole of hydrogen in the presence of palladium as a catalyst and recovering the tetracycline thus formed.
10. A process as claimed in claim 9, wherein the reaction is performed in the presence of a basic, acid binding agent.
11. A sodium salt of tetracycline.
12. A calcium salt of tetracycline.
13. A solid antibiotic preparation essentially comprising tetracycline hydrochloride.
14. Crystalline tetracycline melting at 170–175° C. with decomposition and having an optical rotation of $[\alpha]_D^{25} = 239°$, when dissolved in methanol at a concentration of 1%.
15. An antibiotic composition useful in the treatment of various infections in animals, whose antibiotic activity is due primarily to the presence of tetracycline
16. An antibiotic composition useful in the treatment of various infections in animals, whose antibiotic activity is due primarily to the presence of a mineral acid salt of tetracycline.

17. An antibiotic composition useful in the treatment of various infections in animals, whose antibiotic activity is due primarily to the presence of an alkali metal salt of tetracycline.

18. An antibiotic composition useful in the treatment of various infections in animals, whose antibiotic activity is due primarily to the presence of an alkaline earth metal salt of tetracycline.

References Cited in the file of this patent

UNITED STATES PATENTS

| | | | |
|---|---|---|---|
| 2,482,055 | Duggar | Sept. 13, | 1949 |
| 2,516,080 | Sobin et al. | July 18, | 1950 |
| 2,609,329 | Niedercorn | Sept. 2, | 1952 |

OTHER REFERENCES

Stephens et al., "J. Am. Chem. Soc.," vol. 74, Oct. 5, 1952, pp. 4976 and 4977.